(12) United States Patent
Tochigi

(10) Patent No.: US 9,167,126 B2
(45) Date of Patent: Oct. 20, 2015

(54) IMAGE READING APPARATUS AND IMAGE FORMING APPARATUS

(71) Applicant: CANON FINETECH INC., Misato-shi, Saitama-ken (JP)

(72) Inventor: Nobuyuki Tochigi, Kawaguchi (JP)

(73) Assignee: CANON FINETECH, INC., Misato-Shi, Saitama-Ken (JP)

( * ) Notice: Subject to any disclaimer, the term of this patent is extended or adjusted under 35 U.S.C. 154(b) by 0 days.

(21) Appl. No.: 14/522,330

(22) Filed: Oct. 23, 2014

(65) Prior Publication Data

US 2015/0116791 A1 Apr. 30, 2015

(30) Foreign Application Priority Data

Oct. 29, 2013 (JP) .................................. 2013-224675

(51) Int. Cl.
| | |
|---|---|
| H04N 1/04 | (2006.01) |
| H04N 1/10 | (2006.01) |
| H04N 1/028 | (2006.01) |
| H04N 1/40 | (2006.01) |

(52) U.S. Cl.
CPC ........... *H04N 1/1039* (2013.01); *H04N 1/0281* (2013.01); *H04N 1/40056* (2013.01); *H04N 2201/0081* (2013.01)

(58) Field of Classification Search
CPC .............. F21V 7/00; F21V 8/00; G02B 6/10; G02B 17/00; G02B 21/36; H04N 1/1013; H04N 1/02815; H04N 2201/02462; H04N 1/12; H04N 2201/02435; H04N 1/401

USPC ......... 358/474, 475, 497, 498, 496, 461, 486, 358/449, 484, 488, 509; 399/205, 367, 380, 399/151, 221; 382/190, 312, 317
See application file for complete search history.

(56) References Cited

U.S. PATENT DOCUMENTS

| | | | | |
|---|---|---|---|---|
| 7,453,055 | B2 * | 11/2008 | Susaki ...................... | 250/208.1 |
| 8,199,371 | B2 * | 6/2012 | Nishina et al. ............... | 358/474 |
| 8,422,917 | B2 * | 4/2013 | Shinkawa ..................... | 399/200 |
| 8,824,022 | B2 * | 9/2014 | Nakajima .................... | 358/474 |
| 2003/0076551 | A1 * | 4/2003 | Kawai et al. .................. | 358/475 |
| 2008/0316548 | A1 * | 12/2008 | Yamauchi et al. ............ | 358/475 |
| 2009/0213440 | A1 * | 8/2009 | Nishina et al. ............... | 358/474 |
| 2009/0323139 | A1 * | 12/2009 | Itoh et al. ...................... | 358/474 |
| 2013/0176602 | A1 * | 7/2013 | Miyake et al. ................ | 358/474 |

FOREIGN PATENT DOCUMENTS

JP    61-142857 (A)    6/1986

* cited by examiner

*Primary Examiner* — Negussie Worku
(74) *Attorney, Agent, or Firm* — Fitzpatrick, Cella, Harper & Scinto

(57) ABSTRACT

An image reading apparatus sets an irradiation region below a fixed reading glass when light guide members diffuse light of LEDs upward so that the irradiation region corresponding to a significantly sagged portion in a main scanning direction is wider than that corresponding to portions on both sides of the significantly sagged portion, and sets a light intensity of a plurality of LEDs corresponding to the significantly sagged portion in the main scanning direction to be larger than that of a plurality of LEDs corresponding to the portions on both sides of the significantly sagged portion. Therefore, the degradation of the illuminance corresponding to the significantly sagged portion due to the pressed fixed reading glass can be prevented, and the entire document can be read with uniform reading precision.

16 Claims, 10 Drawing Sheets

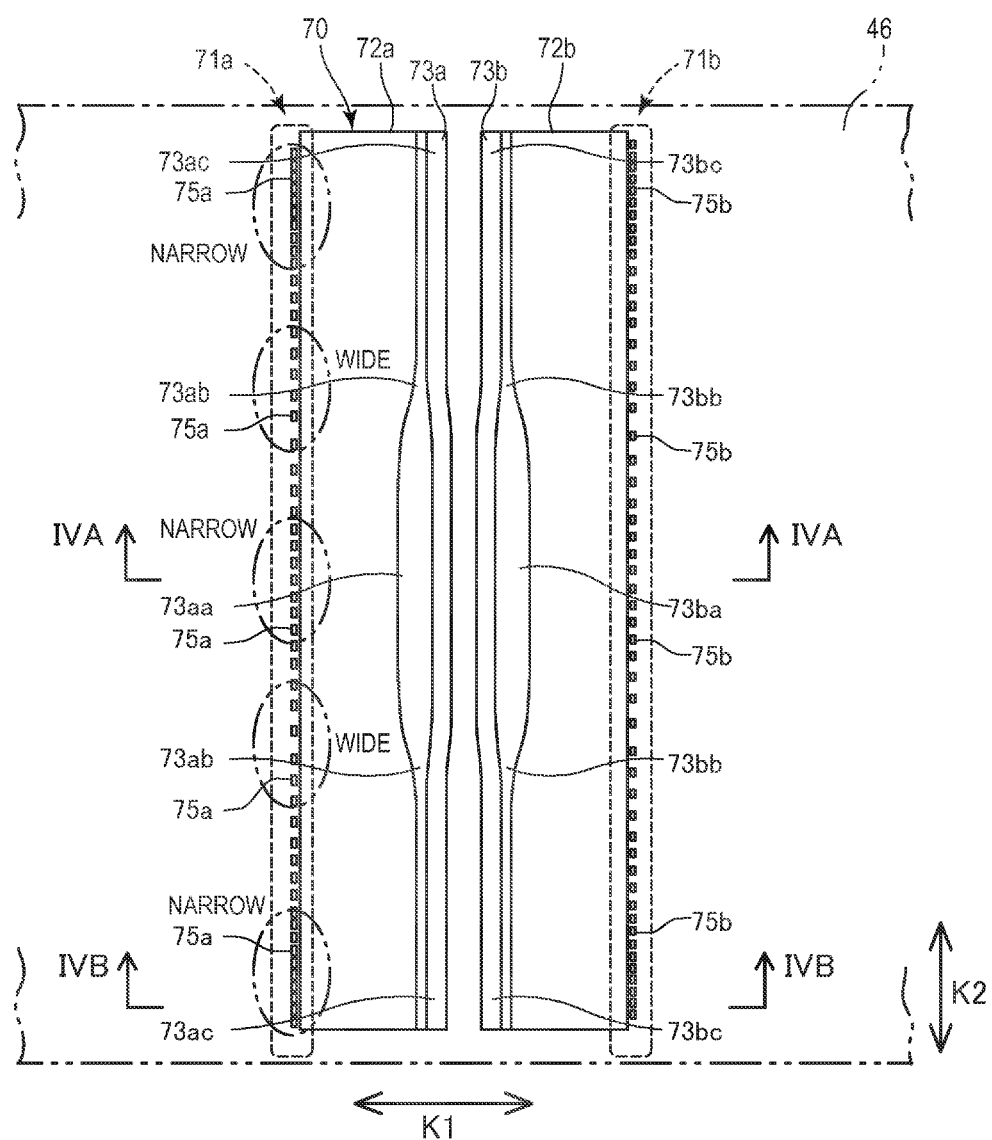

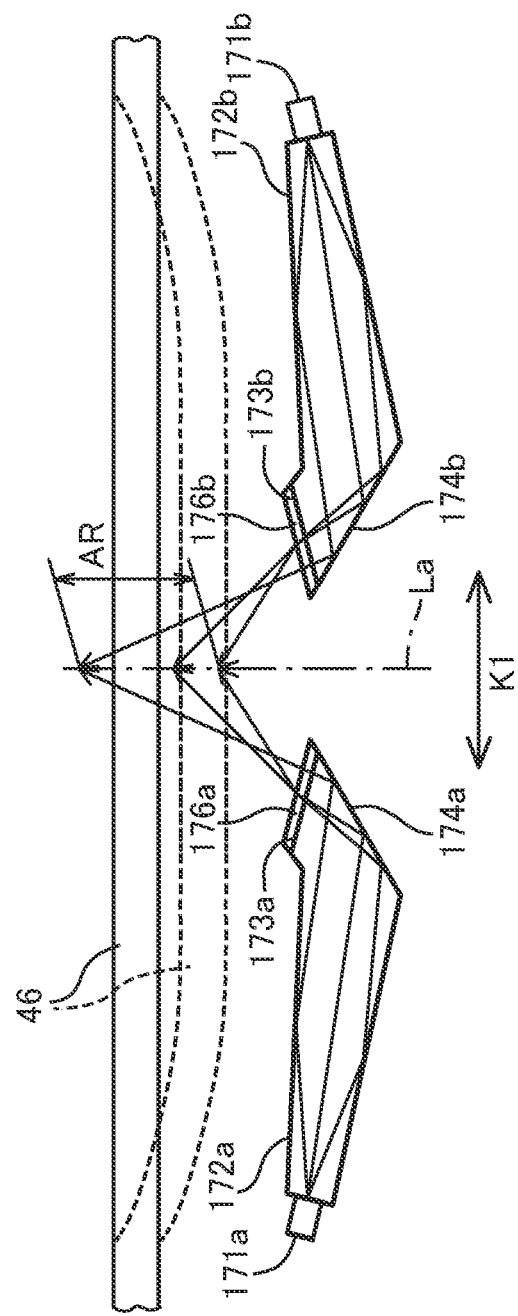

IMAGE READING APPARATUS AND IMAGE FORMING APPARATUS

BACKGROUND OF THE INVENTION

1. Field of the Invention

The present invention relates to an image reading apparatus, and an image forming apparatus having an apparatus body including the image reading apparatus.

2. Description of the Related Art

FIG. 8 is a schematic cross-sectional view taken along a moving direction K1 of a carriage 807 of an image reading apparatus 800 according to a comparative example. Light L emitted from an LED 801 of the carriage 807 passes through a light guide member 802 and illuminates a document surface (image surface) Gf of a document G placed on a fixed reading glass 803. The carriage 807 reads a two-dimensional image of the document surface Gf through line reading in a main scanning direction orthogonal to the moving direction K1 and movement in a sub-scanning direction that is the moving direction K1. The light L reflected from the document surface Gf is further reflected by a plurality of reflecting mirrors 804, and forms an image on a photoelectric conversion element 806 by an imaging optical unit 805. Then, the light L is converted into an electrical signal.

In general, the light L emitted from the LED 801 has such a light distribution characteristic that the light is bright at a center and becomes darker in positions away from the center. A light intensity obtained when only one LED 801 is used as a light source to illuminate the document is not sufficient to illuminate the document. Therefore, a plurality of LEDs 801 is necessary. A portion including the LEDs 801 and the light guide member 802 serves as a document illumination unit 808.

There is such an image reading apparatus that, when the LEDs 801 in the document illumination unit 808 are used as a light source for document illumination, the plurality of LEDs are arranged in an array form to prevent degradation of a peripheral light intensity due to the imaging optical unit 805 and this arrangement has been devised (Japanese Patent Application Laid-Open No. S61-142857).

In this image reading apparatus, a large number of light emitting elements are arranged in a main scanning direction, and at least one of an emission intensity of each light emitting element and an arrangement pitch between the light emitting elements is changed so that an intensity of irradiation light from both end portions in the main scanning direction is larger than that from a central portion in the main scanning direction. As a result, in the image reading apparatus, a cosine-fourth-law characteristic of an imaging lens is corrected in an illuminance distribution on a document irradiation surface in advance.

In the image reading apparatus according to the comparative example, there is a problem in that, when the fixed reading glass 803 serving as a transparent member is deflected in a direction approaching the carriage 807, the illuminance is insufficient and uneven, and the entire document cannot be read with uniform reading precision.

As illustrated in FIG. 9, when a document GB having a great thickness and a binding portion, such as papers or a book, is placed on the fixed reading glass 803 by a user, there is a gap C between the document GB and the fixed reading glass 803. In order to reduce the gap C, the user strongly presses the document GB against the fixed reading glass 803 through intermediation of a pressing plate 847 for covering the fixed reading glass 803 (in a direction indicated by an arrow W). Then, a pressed portion of the fixed reading glass 803 may be elastically deformed downward from a flat position indicated by a solid line and may be deflected as indicated by a dashed line. When the fixed reading glass 803 is deflected downward, the distance between the fixed reading glass 803 and the carriage 807 is not uniform. Therefore, in the image reading apparatus according to the comparative example, there is a problem in that the illuminance is insufficient and uneven, and the entire document cannot be read with uniform reading precision.

Further, an image forming apparatus having an apparatus body including such an image reading apparatus has a problem in that a high-quality image cannot be formed.

SUMMARY OF THE INVENTION

The present invention provides an image reading apparatus capable of suppressing degradation of illuminance near a significantly sagged portion and unevenness of illuminance even when a transparent member on which a document is placed is strongly pressed and a portion of the transparent member in the main scanning direction is significantly sagged, and also provides an image forming apparatus including the image reading apparatus.

According to one embodiment of the present invention, there is provided an image reading apparatus, including: a transparent member on which a document is placed; and a light source configured to emit light for irradiating the document placed on the transparent member, the light source emitting the light so that a light intensity irradiated on a second portion of the transparent member, which has a larger deflection amount than that of a first portion of the transparent member, is larger than a light intensity irradiated on the first portion in a deflecting direction of the second portion.

According to another embodiment of the present invention, there is provided an image reading apparatus, including: a transparent member on which a document is placed; a moving member arranged below the transparent member and configured to reciprocate in a sub-scanning direction; a plurality of light sources provided in the moving member and configured to emit light for irradiating the document placed on the transparent member; a light guide member provided in the moving member so as to be spaced away from and opposed to a lower surface of the transparent member, and configured to guide the light of each of the plurality of light sources to a region below the transparent member in a main scanning direction, and to diffuse the light upward so as to irradiate the document placed on the transparent member; a deflection amount detection unit detecting a downward deflection amount of the transparent member; and an emission intensity adjustment unit configured to adjust an emission intensity of the each of the plurality of light sources based on an electric current, wherein the emission intensity adjustment unit increases the emission intensity of the each of the plurality of light sources corresponding to a portion having a large deflection amount in the main scanning direction as the deflection amount detected by the deflection amount detection unit is larger.

According to one embodiment of the present invention, there is provided an image forming apparatus, including: any one of the above-mentioned image reading apparatus configured to read an image of the document; and an image forming unit forming an image on a sheet based on image reading information read by the image reading apparatus.

In the image reading apparatus of the present invention, the light intensity of the region in which the diffusion region in the main scanning direction is wide is set to be larger than that of the narrow region, and hence it is possible to prevent the degradation of the illuminance when the transparent member is pressed and sagged, and to read the entire document with uniform reading precision.

In the image reading apparatus of the present invention, the emission intensity adjustment unit increases the emission light intensity source corresponding to the portion having a large deflection amount in the main scanning direction as the deflection amount detected by the deflection amount detection unit is larger, and hence it is possible to prevent the degradation of the illuminance when the transparent member is pressed and sagged. Further, it is possible to read the entire document with uniform reading precision.

The image forming apparatus of the present invention includes the image reading apparatus capable of reading the entire document with uniform reading precision, and hence it is possible to form a high-quality image on a sheet.

Further features of the present invention will become apparent from the following description of exemplary embodiments with reference to the attached drawings.

BRIEF DESCRIPTION OF THE DRAWINGS

FIG. 3A is a plan view of a light source and a light guide member illustrated in FIG. 2.

FIG. 5 illustrates a light guide member having a different form from that of the light guide member of FIGS. 4A and 4B.

DESCRIPTION OF THE EMBODIMENTS

Now, an image reading apparatus according to embodiments of the present invention and an image forming apparatus having an apparatus body including the image reading apparatus are described with reference to the drawings.

Figure 1:
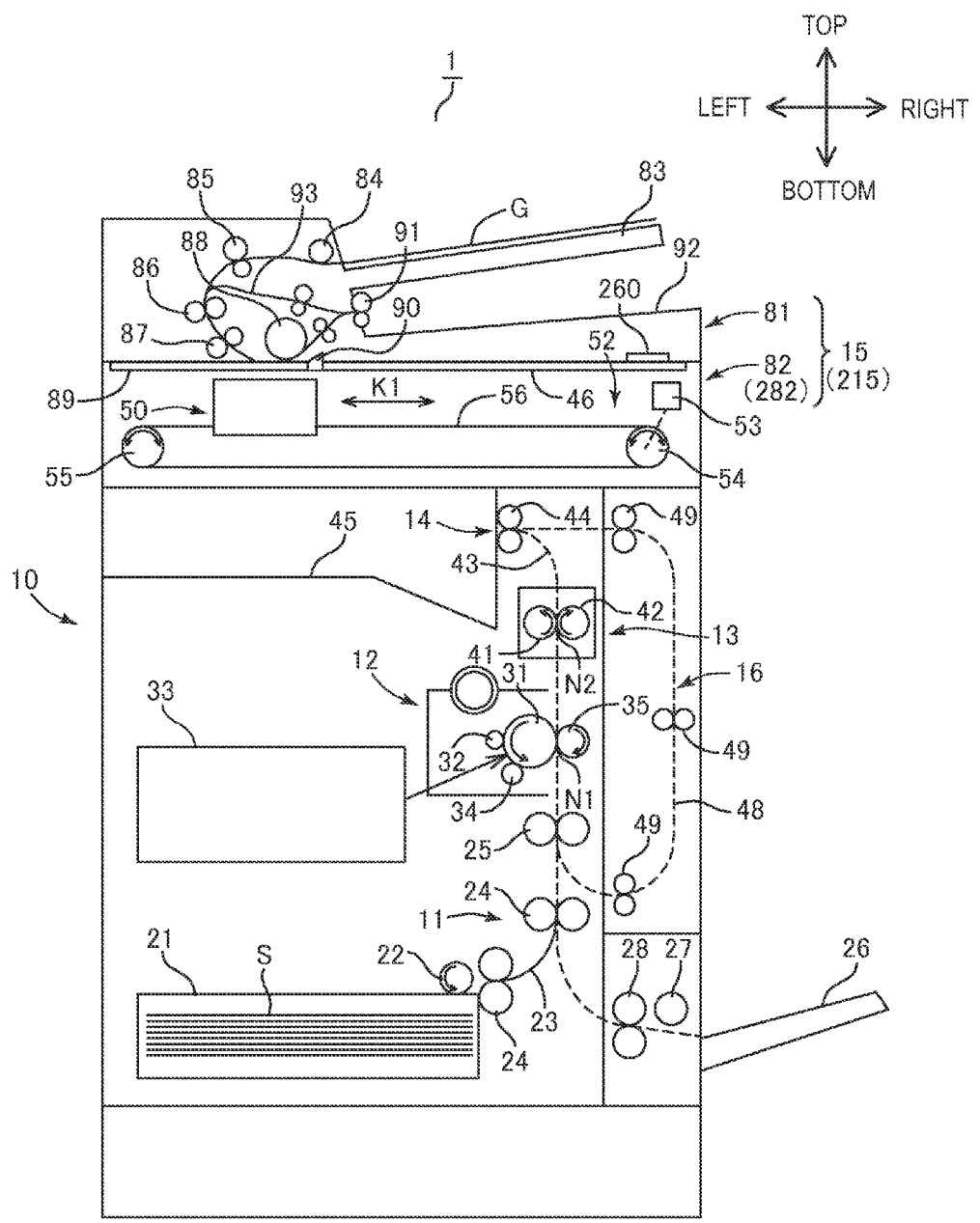
FIG. 1 is a cross-sectional view taken along a sheet conveying direction of an image forming apparatus according to a first embodiment of the present invention.

FIG. 1 is a cross-sectional view taken along a sheet conveying direction of the image forming apparatus of the present invention. Vertical and horizontal directions are indicated by arrows in FIG. 1. Further, a direction intersecting the vertical direction and the horizontal direction is a main scanning direction (a direction indicated by an arrow K2 of FIG. 3A), and the horizontal direction (a direction indicated by an arrow K1) is a sub-scanning direction. Further, the sub-scanning direction K1 is a moving direction of a carriage 50 to be described below.

An image forming apparatus 1 includes a box-shaped apparatus body (body frame) 10, and an image reading apparatus 15 provided on an upper part of the apparatus body 10. A sheet feed unit 11, an image forming unit 12, a fixing unit 13, and a sheet delivery unit 14 are provided in this order from the bottom to the top in the apparatus body 10 of the image forming apparatus. Further, a sheet re-feed unit 16 is provided on the right side of the image forming unit 12 and the fixing unit 13.

A sheet feed cassette 21, a pickup roller 22, a feed path 23, a feed roller pair 24, a registration roller pair 25, a manual feed tray 26, and the like are arranged in the sheet feed unit 11. Only one of sheets S received in a stacked state in the sheet feed cassette 21 is separated due to rotation of the pickup roller 22 and fed to the feed path 23. Further, the sheet S is deflected by coming in contact with a nip of the registration roller pair 25 stopping without rotation due to the feed roller pair 24, and skew are straightened. The sheet S is also fed by a pickup roller 27 and a feed roller pair 28 from the manual feed tray 26.

A photosensitive drum 31, and a charging roller 32, a laser unit 33 serving as an exposure device, a developing roller 34, and a transfer roller 35, which are arranged sequentially around the photosensitive drum 31 in a rotation direction of the photosensitive drum 31, are provided in the image forming unit 12.

A surface of the photosensitive drum 31 is uniformly charged by the charging roller 32 and scanned with laser light from the laser unit 33. Charge in a portion irradiated with laser light is removed and an electrostatic latent image is formed on the surface of the photosensitive drum 31. Toner is caused to adhere to the electrostatic latent image by the developing roller 34 and developed as a toner image. This toner image is conveyed to a transfer nip portion N1 due to rotation of the photosensitive drum 31. In synchronization with this timing, the sheet S is fed from the registration roller pair 25 to the transfer nip portion N1. While the fed sheet S is nipped and conveyed in the transfer nip portion N1, the toner image is transferred from the photosensitive drum 31 onto the sheet S by the transfer roller 35. The laser light radiated from the laser unit 33 is controlled ON and OFF based on image reading information of a document surface (image surface) Gf of a document G read by the image reading apparatus 15 to be described below.

A fixing roller 41, a pressure roller 42, and the like are arranged in the fixing unit 13. The fixing roller 41 is heated to a predetermined fixing temperature (e.g., about 180° C.) and the pressure roller 42 is brought into contact with the fixing roller 41 to form a fixing nip portion N2 between the rollers. The sheet S having the toner image transferred onto the front surface is conveyed into the fixing nip portion N2 and heated by the fixing roller 41 while being nipped and conveyed in the fixing nip portion N2. In this manner, the toner image is fixed onto the front surface.

A delivery path 43, a delivery roller pair 44, a delivery tray 45, and the like are arranged in the sheet delivery unit 14. The sheet S having the fixed toner image is conveyed along the delivery path 43 and delivered onto the delivery tray 45 by the delivery roller pair 44.

The sheet re-feed unit 16 includes a re-feed path 48 and re-feed roller pairs 49. When the toner image is to be also formed on a back surface of the sheet S, the sheet S having the toner image fixed onto the front surface is fed to the re-feed path 48 by stopping the delivery roller pair 44 and rotating the delivery roller pair 44 in a reverse direction before a trailing edge of the sheet S is passed through the delivery roller pair 44. This sheet S is conveyed along the re-feed path 48 by the re-feed roller pairs 49, enters the feed path 23, and is stopped by the registration roller pair 25 stopping without rotation. The sheet S is then delivered onto the delivery tray 45 after the toner image is transferred and fixed onto the back surface, as in the case in which the toner image is transferred and fixed onto the front surface.

Image Reading Apparatus of First Embodiment

The image reading apparatus 15 includes a document feed unit 81 and an image reading unit 82. The document feed unit 81 is provided on the image reading unit 82 in an openable and closable manner.

The document feed unit 81 automatically conveys the document G to the image reading unit 82. The document feed unit 81 conveys the document G placed in a document tray 83 by a user to a conveyance roller pair 85 using a pickup roller 84. The conveyance roller pair 85 conveys the document G to a registration roller pair 86. The skewed document is straightened using the registration roller pair 86 and the conveyance roller pair 85. Then, the document G is fed onto a flow reading glass 89, on which the document is read in a flowing manner, by a conveyance roller pair 87 and a white roller 88. The carriage 50 stopped under the flow reading glass 89, which is described below, reads an image of the document. The document from which the image has been read is scooped from the flow reading glass 89 by a scooping member 90 and delivered onto a delivery tray 92 by a delivery roller pair 91. When both surfaces of the document are to be read, the document is reversed by a reverse path 93 and conveyed to the flow reading glass 89 again, and the image of the other surface is read by the carriage 50. Finally, the document is delivered onto the delivery tray 92. Thus, a method of causing the document to pass along the flow reading glass 89 and reading the document under a state in which the carriage 50 is stopped in a position illustrated in FIG. 1 is called flow reading.

The image reading unit 82 includes the carriage 50, a fixed reading glass 46, the flow reading glass 89, and a moving device 52.

The moving device 52 includes, a motor 53, a driving pulley 54 fixed to an output shaft of the motor, a driven pulley 55, and a wire 56 connected to the carriage across the pulleys, and moves the carriage 50 in the sub-scanning direction K1. The moving device 52 rotates the motor 53 in a forward direction or a reverse direction to rotate the driving pulley 54 in a forward direction or a reverse direction and reciprocate the carriage 50 in the sub-scanning direction K1 through intermediation of the wire 56. A document illumination unit 70 to be described below is incorporated in the carriage 50.

Figure 2:
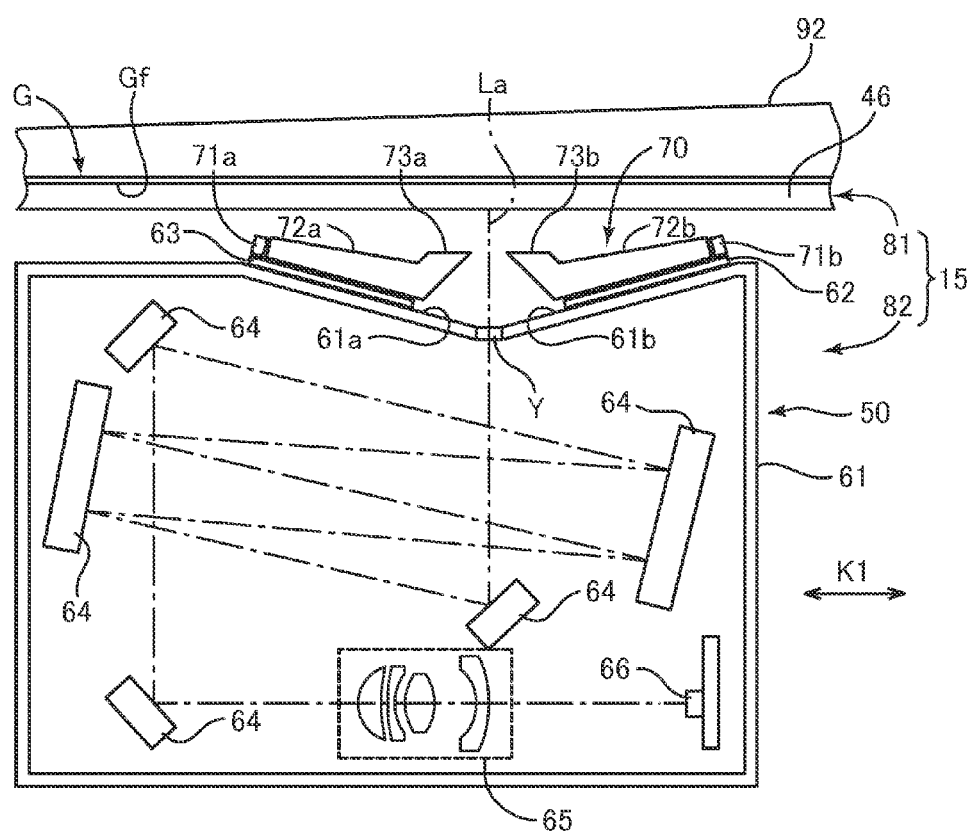
FIG. 2 is a schematic cross-sectional view taken along a moving direction (sub-scanning direction) of a carriage of an image reading apparatus according to the first embodiment of the present invention.

FIG. 2 is a cross-sectional view taken along the moving direction (sub-scanning direction) of the carriage of the image reading apparatus. The image reading unit 82 reads the document G, which is placed on an upper surface of the fixed reading glass 46 with the document surface Gf being directed downward, as the carriage 50 moves in the sub-scanning direction K1 below the fixed reading glass 46. In this case, the document G is pressed against the fixed reading glass 46 by the document feed unit 81, and the document surface Gf is read.

The carriage 50 is moved in the sub-scanning direction K1 by the moving device 52 (FIG. 1) while irradiating the document surface Gf of the document G with light in the main scanning direction K2 (FIG. 3A), to thereby scan the entire document surface Gf and read image information. Thus, a method of moving the carriage 50 in the sub-scanning direction K1 and reading the document placed on the fixed reading glass 46 is called fixed reading.

The image information is transmitted to the above-mentioned laser unit 33 and used for ON-OFF control of the laser light. The carriage 50 is further described below.

Next, the carriage 50 and the document illumination unit 70 of the image reading apparatus 15 are described with reference to FIG. 2.

The carriage 50 includes a housing 61, the document illumination unit 70, support members 62 and 63, a plurality of mirrors 64, an imaging optical unit 65, and a photoelectric conversion element 66 such as a CCD. The housing 61 is a moving member having a box shape, and is arranged so as to reciprocate in the sub-scanning direction K1 below the fixed reading glass (transparent member) 46 and the flow reading glass 89 (FIG. 1) on which the document G is located. The support members 62 and 63 are members for mounting the document illumination unit 70 to the housing 61 of the carriage. The photoelectric conversion element 66 is a long member extending along the main scanning direction (the direction indicated by an arrow K2 of FIG. 3A), and is an image-pickup element for receiving light reflected from the document G to read the image information.

Inclined portions of a top surface of the housing 61 of the carriage are illumination mounting portions 61a and 61b. The document illumination unit 70 is mounted on the illumination mounting portions 61a and 61b by the support members 62 and 63. A slit Y is formed in a position on the housing 61 corresponding to an axis La of reading light. The slit Y is formed along the main scanning direction. The document illumination unit 70 is described below.

The plurality of mirrors 64 are provided so as to increase the number of times of reflection of light that has passed through the slit Y and increase a length of an optical path of the light up to the photoelectric conversion element 66. The imaging optical unit 65 forms an image on the photoelectric conversion element 66 using the light reflected by the last mirror 64. The housing 61 of the carriage reciprocates in the sub-scanning direction K1 through guiding of a guide member (not shown) and driving of the moving device 52 (FIG. 1).

Figure 3B:
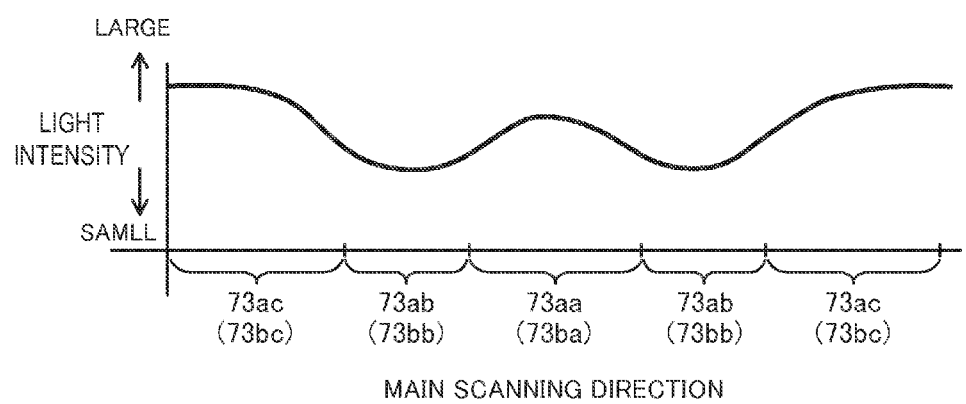
FIG. 3B shows a light intensity emitted from the light guide member.

Next, the document illumination unit 70 is described with reference to FIGS. 3A and 3B. FIG. 3A is a plan view of the document illumination unit 70 illustrated in FIG. 2. The document illumination unit 70 includes a first light source array 71a, a second light source array 71b, a first light guide member 72a, and a second light guide member 72b. The first light guide member 72a and the second light guide member 72b are long members, and are provided in the housing 61 of the carriage in a direction orthogonal to the moving direction K1 of the carriage 50. The direction in which the first light guide member 72a and the second light guide member 72b are arranged is the main scanning direction K2. Further, the first light guide member 72a and the second light guide member 72b are provided in the housing 61 of the carriage so as to be spaced away from and opposed to lower surfaces of the flow reading glass 89 and the fixed reading glass 46.

The first light source array 71a is arranged adjacent to the first light guide member 72a in the main scanning direction K2. An exit surface 73a is formed in the first light guide member 72a. Light emitted from the first light source array 71a passes through the first light guide member 72a, exits from the exit surface 73a of the first light guide member 72a, and irradiates the document G.

The second light source array 71b is arranged adjacent to the second light guide member 72b in the main scanning direction K2. An exit surface 73b is also formed in the second light guide member 72b. Light emitted from the second light source array 71b passes through the second light guide member 72b, exits from the exit surface 73b of the second light guide member 72b, and irradiates the document G.

The first light source array 71a, the second light source array 71b, the first light guide member 72a, and the second light guide member 72b serve as an illuminance degradation reduction unit.

Shapes of the exit surface 73a of the first light guide member 72a and the exit surface 73b of the second light guide member 72b differ in central portions 73aa and 73ba in the main scanning direction K2, portions (intermediate portions) 73ab and 73bb on both sides of the central portions, and end portions 73ac and 73bc.

Further, the first light source array 71a and the second light source array 71b include a plurality of LEDs 75a and 75b arranged as light sources in the main scanning direction K2. The LEDs 75a and 75b corresponding to the central portions, the intermediate portions, and the end portions in the main scanning direction K2 of the first light guide member 72a and the second light guide member 72b have different arrangement pitches.

Here, the arrangement pitch of the LED 75a corresponding to the central portion 73aa of the first light guide member 72a and the LED 75b corresponding to the central portion 73ba of the second light guide member 72b is assumed to be Pa. The arrangement pitch corresponding to the portions (intermediate portions) 73ab and 73bb on both sides of the central portions is assumed to be Pb. Further, the arrangement pitch corresponding to the end portions 73ac and 73bc is assumed to be Pc.

Then, the following relationship is set.

$$Pb>Pa>Pc \qquad \text{Expression 1}$$

That is, a narrow arrangement pitch is set in the central portions, a wide arrangement pitch, which is wider than that in the central portions, is set in the intermediate portions, and a narrower arrangement pitch, which is narrower than that in the central portions, is set in the end portions.

The respective arrangement pitches may be equal within the respective portions. However, in this case, a light intensity exiting from the first and second light guide members suddenly changes at boundaries between the respective portions. Therefore, in order to prevent the light intensity from suddenly changing at the boundaries between the respective portions, the pitches within the respective portions may be unequal. That is, it is preferred to have such an arrangement pitch that the light intensity exiting from the first and second light guide members changes in a curved manner, as shown in FIG. 3B.

Figure 4A:
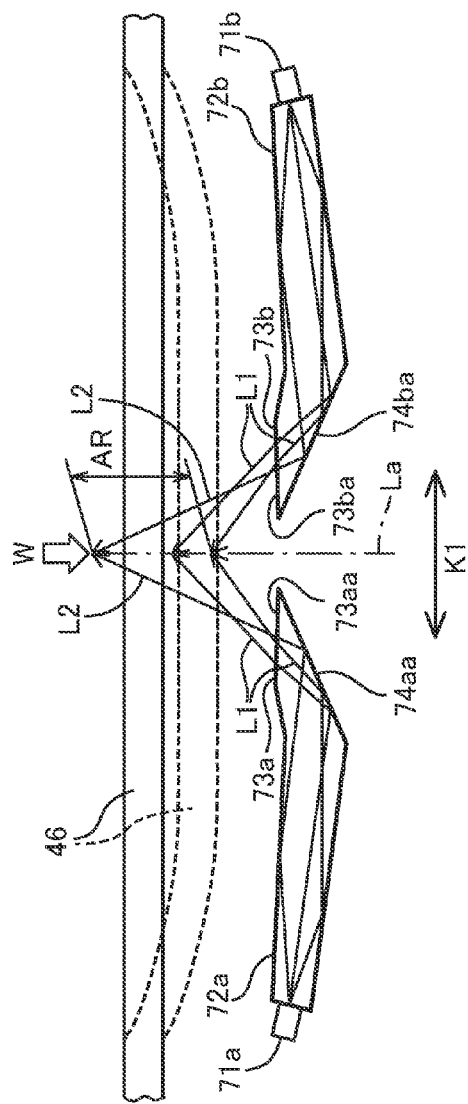
FIG. 4A is a cross-sectional view taken along a sub-scanning direction of a fixed reading glass and a light guide member as indicated by an arrow IVA-IVA of FIG. 3A.
Figure 4B:
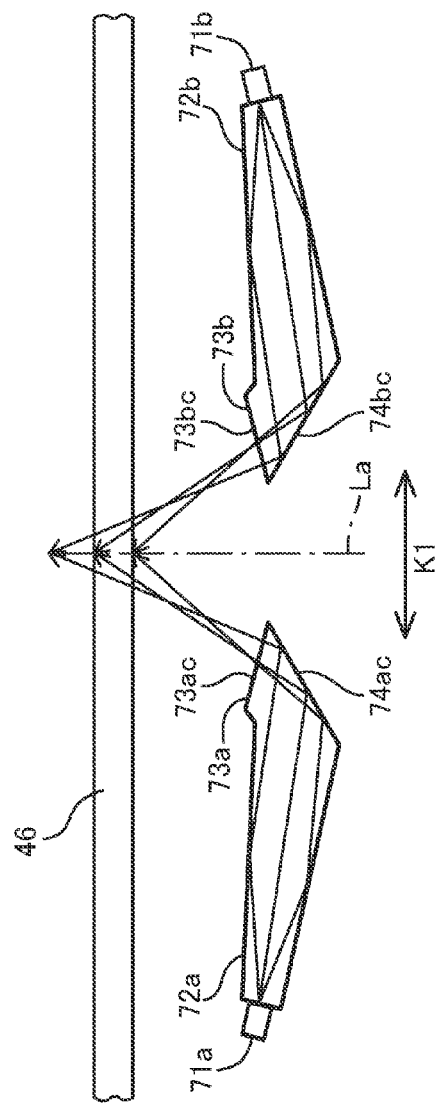
FIG. 4B is a cross-sectional view taken along the sub-scanning direction of the fixed reading glass and the light guide member as indicated by an arrow IVB-IVB of FIG. 3A.

Next, a document irradiation operation of the document illumination unit 70 is described with reference to FIGS. 4A and 4B. FIGS. 4A and 4B are cross-sectional views taken along the sub-scanning direction of the fixed reading glass and the light guide member. FIG. 4A is a cross-sectional view taken along an arrow IVA-IVA of FIG. 3A, and FIG. 4B is a cross-sectional view taken along an arrow IVB-IVB of FIG. 3A.

In FIG. 4A, when a document (not shown) such as a book is placed by a user and a pressing force W is applied via the document feed unit 81 (FIG. 1), the fixed reading glass 46 may be deflected downward as indicated by a dashed line from a position indicated by a solid line. An arrow conceptually indicates a direction of the light for irradiating the document. Further, a line La in FIG. 4A indicates an axis of reading light of the document in the sub-scanning direction.

The conventional light guide member was formed without consideration for deflection of the fixed reading glass 46. A light guide member has a condensing effect for a related-art tubular light source. Therefore, when the fixed reading glass 46 is deflected and a reading position is lowered, light exiting from the light guide member having a uniform cross-section in the sub-scanning direction is less likely to reach the vicinity of the central portion in the main scanning direction, thus causing degradation of illuminance.

However, in the first light guide member 72a and the second light guide member 72b of this embodiment, shapes of the cross-section in the sub-scanning direction differ in the central portions 73aa and 73ba, the intermediate portions 73ab and 73bb, and the end portions 73ac and 73bc in the main scanning direction.

Reflecting surfaces 74aa and 74ba of the central portions 73aa and 73ba illustrated in FIG. 4A have smaller angles than the reflecting surfaces 74ac and 74bc of the end portions 73ac and 73bc illustrated in FIG. 4B. Angles (not shown) of the reflecting surfaces 74ab and 74bb of the intermediate portions 73ab and 73bb are medium angles between those in FIGS. 4A and 4B.

Therefore, partial light L1 exiting from the exit surfaces 73aa and 73ba of the central portions is refracted, and partial light L2 is not refracted. As a result, when the first light guide member and the second light guide member diffuse the light of the LED upward, an irradiation region (diffusion region) AR below the fixed reading glass 46 is set to be larger in the central portions in the main scanning direction than in the portions (intermediate portions) on both sides of the central portions and in the end portions. Therefore, the irradiation region AR is widened downward near the line La, and thus the reading position can be irradiated with light even in the fixed reading glass 46 that has been deflected as indicated by the dashed line.

When the shape of the light guide member is changed so as to simply widen the irradiation region AR downward, a light intensity per unit area decreases and the illuminance of the document decreases. However, the arrangement pitch of the LEDs in the central portion, in which the irradiation region is widened, is narrower than that in the intermediate portion, as illustrated in FIG. 3A or represented by Expression 1. Therefore, the light intensity per unit area does not decrease even when the irradiation region is widened. Accordingly, in the image reading apparatus 15, it is possible to prevent degradation of the illuminance for the document and maintain the image reading precision substantially uniformly even when the fixed reading glass 46 is deflected downward.

When the imaging optical unit 65 moves together with the carriage, it is necessary for the imaging optical unit 65 to have a wider angle than a 2:1 mirror scanning type imaging optical unit so as to downsize the carriage.

When the imaging optical unit 65 has the wider angle, a light intensity at peripheral angles of view decreases in proportion to a cosine fourth power of a half angle of view of the imaging optical unit 65. Therefore, the peripheral light intensity decreases, for example, to 56% at the half angle of view of 30° in comparison with the central portion.

When a light source array is arranged in the central portion with the same arrangement pitch as the arrangement pitch of the light source array at which light intensity degradation is reduced, it is necessary to greatly increase an irradiation region of the central portion and it is necessary for the shape of the light guide member to greatly differ from the shape in the end portion. Therefore, difficulty or cost of manufacture may increase. Further, the greatly increased irradiation region may be highly likely to cause stray light.

There are various arrangement pitches depending on the angle of view of the imaging optical unit 65, but the arrangement pitch satisfying the relationship of Expression 1 is preferred when the imaging optical unit 65 moves together with the carriage as in this embodiment.

In the document illumination unit 70 described above, the cross-sectional shapes in the sub-scanning direction of the central portions, the intermediate portions, and the end portions in the main scanning direction of the first light guide member 72a and the second light guide member 72b are changed so that the irradiation region AR differs in the vertical direction. However, diffusion sheets 176a and 176b may be provided on exit surfaces 173a and 173b of central portions in the main scanning direction of a first light guide member 172a and a second light guide member 172b illustrated in FIG. 5 to enlarge the irradiation region AR in the vertical direction. Alternatively, the exit surfaces 173a and 173b may be formed as finely roughened surfaces (not shown), for example, through sandblasting to enlarge the irradiation region AR in the vertical direction. Thus, when the diffusion sheets are provided on the exit surfaces 173a and 173b or when the exit surfaces 173a and 173b are formed as roughened surfaces, the same cross-sectional shape in the sub-scanning direction may be employed over an entire length of the first light guide member 172a and the second light guide member 172b so that the shapes of the light guide members can be simplified. In FIG. 5, reflecting surfaces 174a and 174b are similar to the reflecting surfaces 74aa and 74ba of FIG. 4A.

Figure 9:
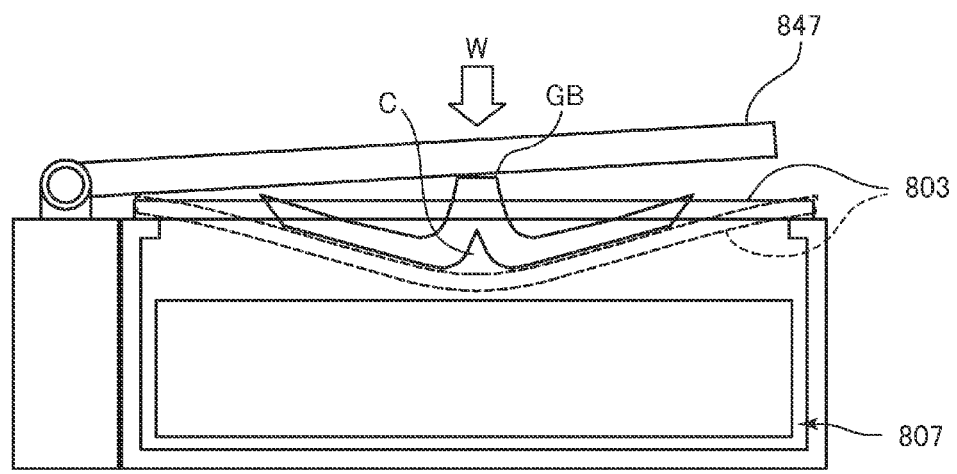
FIG. 9 is a schematic view illustrating deformation of a fixed reading glass of the image reading apparatus according to the comparative example.

The image reading apparatus 15 described above presses the document against the fixed reading glass 46 using the document feed unit 81, but the pressing plate 847 illustrated in FIG. 9 may be provided in place of the document feed unit 81 and the document may be pressed by the pressing plate 847. In this case, the flow reading glass 89 is unnecessary.

In the above description, a light intensity for irradiating the document through the first light guide members 72a and 172a and the second light guide members 72b and 172b may be changed with the same light intensities of the respective LEDs and different arrangement pitches. However, the present invention is not limited thereto and the light intensity for irradiating the document may be changed with the same arrangement pitches and different light intensities of the LEDs.

Image Reading Apparatus of Second Embodiment

Next, an image reading apparatus 215 according to a second embodiment of the present invention is described with reference to FIG. 6. The image reading apparatus 215 according to the second embodiment includes a document feed unit 81 and an image reading unit 282 similarly to the image reading apparatus 15 according to the first embodiment. The document feed unit according to the second embodiment has the same configuration as the document feed unit according to the first embodiment, and the image reading unit has a partially different configuration. Therefore, different portions are mainly illustrated and described, and the same portions are denoted with the same reference symbols to omit repeated description.

A first light guide member 272a and a second light guide member 272b of a carriage 250 are long members having the cross-sectional shapes as illustrated in FIG. 4B over their entire lengths in a main scanning direction. LEDs 275a and 275b are arranged as light sources at equal intervals along outer end portions in the main scanning direction of the light guide members 272a and 272b.

Figure 6:
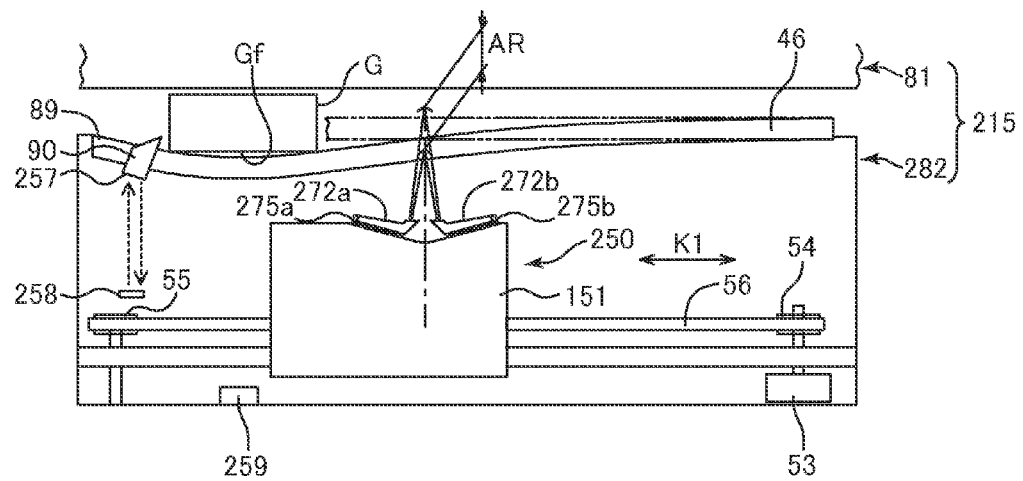
FIG. 6 is a schematic cross-sectional view taken along a sub-scanning direction of an image reading apparatus according to a second embodiment of the present invention.

A document G placed on an upper surface of a fixed reading glass 46 with a document surface Gf being directed downward is pressed by a user through intermediation of the document feed unit 81, and is brought into close contact with the fixed reading glass 46 while the fixed reading glass 46 is deflected downward as illustrated in FIG. 6. In this case, a scooping member 90 provided between the fixed reading glass 46 and a flow reading glass 89 is also deflected downward. The scooping member 90 is a long member along the main scanning direction, and hence its central portion in the main scanning direction is most deflected.

A reflecting member 257 is bonded onto a lower surface of the central portion in the main scanning direction of the scooping member 90. A distance measuring sensor 258 for detecting a deflection amount when the fixed reading glass 46 and the scooping member 90 are deflected downward is arranged under the reflecting member 257. The distance measuring sensor 258 detects a downward deflection amount of the fixed reading glass 46 by receiving irradiation light reflected by the reflecting member 257. The deflection amount is detected when the fixed reading glass 46 is deflected downward and the reflecting member 257 approaches the distance measuring sensor 258 so that distance therebetween is shortened.

When the reflecting member 257 is provided within a reading region of the fixed reading glass 46, light of the LEDs 275a and 275b is reflected and read by the image reading unit 282. Therefore, the reflecting member 257 is provided on the lower surface of the scooping member 90, which is arranged outside the image reading region of the image reading unit 282 and deflected similarly to the fixed reading glass 46. A shading white plate (not shown) may be used as the reflecting member in place of a dedicated reflecting member. In this case, the distance measuring sensor 258 needs to be provided under the shading white plate.

Figure 7:
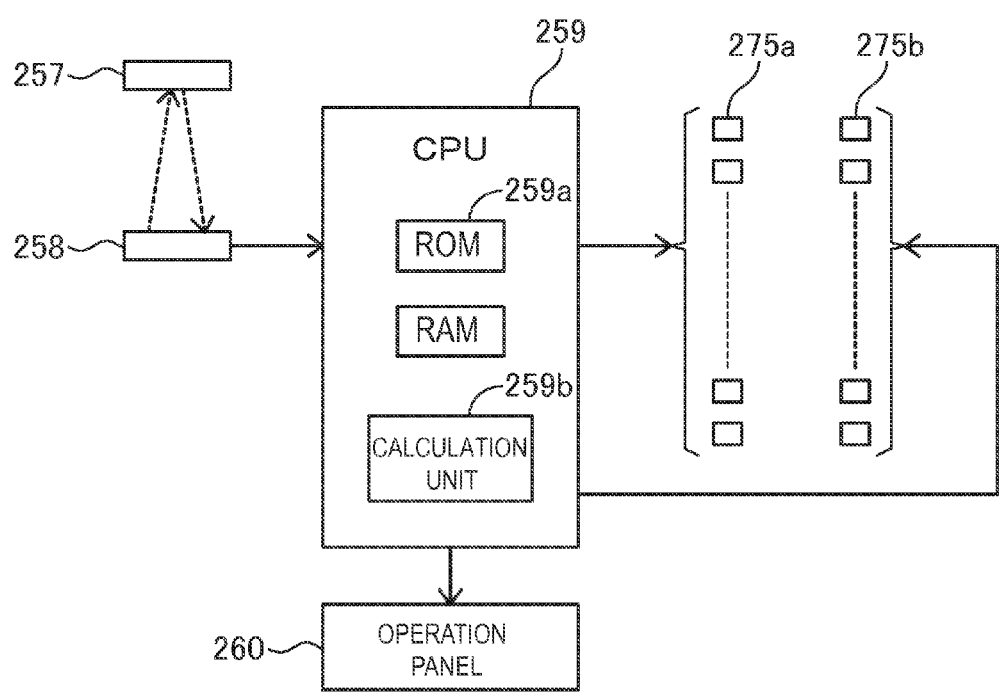
FIG. 7 is a control block diagram of the image reading apparatus according to the second embodiment of the present invention.
Figure 8:
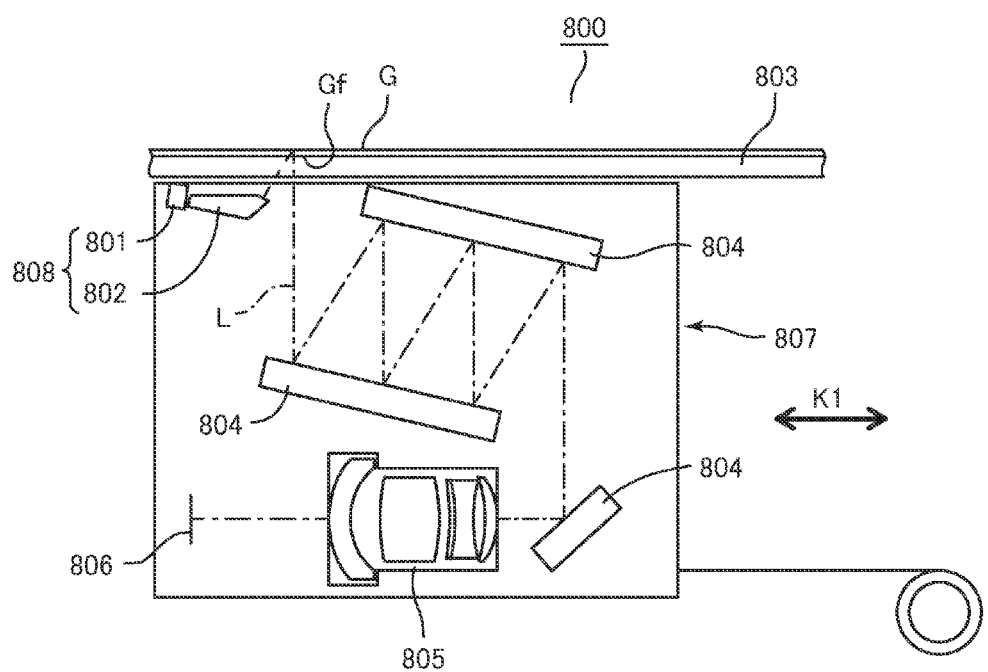
FIG. 8 is a schematic cross-sectional view taken along a sub-scanning direction of a carriage of an image reading apparatus according to a comparative example.

The distance measuring sensor 258 performs distance measurement under a state in which the document has not yet been placed on the fixed reading glass 46 when power is supplied to the image forming apparatus 1, to thereby acquire an initial value of a glass deflection amount. This initial value is stored in a ROM 259a of a CPU 259 illustrated in FIG. 7. The initial value may be acquired at the time of factory shipment and stored in the ROM 259a in advance.

Then, the document G is set on the fixed reading glass 46 and the fixed reading glass 46 is closed with the document feed unit 81. When the fixed reading glass 46 is closed and a copy start button is pressed, the distance measuring sensor 258 performs the distance measurement to acquire a current state value. Further, the CPU 259 compares the initial value with the current state value using a calculation unit 259b to calculate the deflection amount of the fixed reading glass 46. As the deflection amount of the fixed reading glass 46 increases, light deviates from the irradiation region (diffusion region) AR of the first light guide member 272a and the second light guide member 272b, and an irradiation intensity of the LEDs 275a and 275b decreases. Therefore, as the calculated deflection amount increases, the CPU 259 serving as an emission intensity adjustment unit increases an electric current value of the LEDs 275a and 275b corresponding to the central portion in the main scanning direction to increase the light intensity and compensate for the lack of the irradiation intensity for the document. As a result, the image reading apparatus 215 can maintain a substantially uniform light intensity for irradiating the document even when the fixed reading glass 46 is deflected downward, to thereby maintain uniform reading precision for the document.

When the deflection amount of the fixed reading glass 46 is large and the carriage 250 may interfere with the fixed reading glass 46 due to its movement in the sub-scanning direction, the CPU 259 stops the carriage 250 without changing the electric current and causes an operation panel 260 to display an abnormal state. The operation panel 260 (FIG. 1) is provided in the apparatus body 10 of the image reading apparatus and is used for the user to input information necessary for image formation, and to display an operation status of the image forming apparatus. In the above-mentioned configuration, the reflecting member 257 and the distance measuring sensor 258 serve as a deflection amount detection unit.

The image reading apparatus 215 described above presses the document against the fixed reading glass 46 using the document feed unit 81, but the pressing plate 847 illustrated in FIG. 9 may be provided in place of the document feed unit 81 and the document may be pressed by the pressing plate 847. In this case, the flow reading glass 89 is unnecessary.

Further, the case in which the central portion in the main scanning direction of the fixed reading glass 46 is deflected has been described above, but the central portion in the main scanning direction is not necessarily deflected depending on the structure of the image reading apparatus. Therefore, a place in which the fixed reading glass 46 is most deflected is not limited to the central portion in the main scanning direction, and a region in which the diffusion region of the light guide member is wide is not limited to the central portion in the main scanning direction.

The exemplary embodiments of the present invention have been described above, but the present invention is not limited to these embodiments, and various modifications and alterations may be made within the scope of the gist of the present invention. For example, it is preferred that portions other than an incident portion of the light guide member have various shapes depending on specifications.

Further, the image forming apparatus including the above-mentioned image reading apparatus can copy a high-quality image on the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-224675, filed Oct. 29, 2013, which is hereby incorporated by reference herein in its entirety.

What is claimed is:

1. An image reading apparatus, comprising:
   a transparent member on which a document is placed; and
   a light source configured to emit light for irradiating the document placed on the transparent member, the light source emitting the light so that a light amount irradiated on a first portion of the transparent member, which has a larger deflection amount than that of a second portion of the transparent member in a case where the placed document presses the transparent member, is larger than a light amount irradiated on the second portion.

2. An image reading apparatus according to claim 1, wherein a deflecting direction of the first portion corresponds to a downward direction.

3. An image reading apparatus according to claim 1, wherein, in a deflecting direction of the transparent member, an irradiation region of the light source is set to be larger in the first portion than the second portion.

4. An image reading apparatus, comprising:
   a transparent member on which a document is placed;
   a moving member arranged below the transparent member and configured to reciprocate in a sub-scanning direction;
   a light source configured to emit light for irradiating the document placed on the transparent member, the light source including a plurality of light sources provided in the moving member; and
   a light guide member provided in the moving member so as to be spaced away from and opposed to a lower surface of the transparent member, and configured to guide the light of each of the plurality of light sources to a region below the transparent member in a main scanning direction, and to diffuse the light upward so as to irradiate the document placed on the transparent member,
   wherein, when the light guide member diffuses the light of the each of the plurality of light sources upward, a diffusion region below the transparent member includes a wide region and a narrow region in the main scanning direction, and
   wherein a light intensity of the each of the plurality of light sources in the main scanning direction is set so that the light intensity corresponding to the wide region is larger than the light intensity corresponding to the narrow region in the main scanning direction.

5. An image reading apparatus according to claim 4, wherein an arrangement pitch of the plurality of light sources corresponding to the wide region is set to be narrower than an arrangement pitch of the plurality of light sources corresponding to the narrow region.

6. An image reading apparatus according to claim 4, wherein an emission intensity of the each of the plurality of light sources corresponding to the wide region is set to be larger than an emission intensity of the each of the plurality of light sources corresponding to the narrow region.

7. An image reading apparatus according to claim 4, further comprising a diffusion sheet provided on a light exit surface of the light guide member corresponding to the wide region.

8. An image reading apparatus according to claim 4, wherein a light exit surface of the light guide member corresponding to the wide region is formed as a roughened surface for diffusing the light of the each of the plurality of light sources.

9. An image reading apparatus according to claim 4, wherein the wide region corresponds to a central portion in the main scanning direction of the light guide member, and
   wherein the narrow region corresponds to portions on both sides of the central portion.

10. An image reading apparatus according to claim 9, wherein the light intensity of the each of the plurality of light sources corresponding to the central portion in the main scanning direction is set to be larger than the light intensity of the each of the plurality of light sources corresponding to the portions on both the sides of the central portion, and to be smaller than the light intensity of the each of the plurality of light sources corresponding to portions on an outer side of the portions on both the sides.

11. An image forming apparatus, comprising:
    the image reading apparatus according to claim 4, which is configured to read an image of the document; and
    an image forming unit forming an image on a sheet based on image reading information read by the image reading apparatus.

12. An image reading apparatus, comprising:
    a transparent member on which a document is placed;
    a moving member arranged below the transparent member and configured to reciprocate in a sub-scanning direction;

a plurality of light sources provided in the moving member and configured to emit light for irradiating the document placed on the transparent member;

a light guide member provided in the moving member so as to be spaced away from and opposed to a lower surface of the transparent member, and configured to guide the light of each of the plurality of light sources to a region below the transparent member in a main scanning direction, and to diffuse the light upward so as to irradiate the document placed on the transparent member;

a deflection amount detection unit detecting a downward deflection amount of the transparent member; and an emission intensity adjustment unit configured to adjust an emission intensity of the each of the plurality of light sources based on an electric current, wherein the emission intensity adjustment unit increases the emission intensity of the each of the plurality of light sources corresponding to a portion having a large deflection amount in the main scanning direction as the deflection amount detected by the deflection amount detection unit is larger.

13. An image reading apparatus according to claim 12, wherein the portion having a large deflection amount corresponds to a central portion in the main scanning direction.

14. An image forming apparatus, comprising:
the image reading apparatus according to claim 12, which is configured to read an image of the document; and
an image forming unit forming an image on a sheet based on image reading information read by the image reading apparatus.

15. An image reading apparatus, comprising:
a transparent member on which a document is placed; and
a light source configured to emit light for irradiating the document placed on the transparent member, the light source emitting the light so that a light amount irradiated on a first portion of the transparent member, which has a larger deflection displacement amount than that of a second portion of the transparent member, is larger than a light amount irradiated on the second portion.

16. An image reading apparatus according to claim 15, wherein, in a deflecting direction of the transparent member, an irradiation region of the light source is set to be larger in the first portion than the second portion.

* * * * *